United States Patent [19]
Meitinger

[11] 3,806,737
[45] Apr. 23, 1974

[54] FREQUENCY DIVIDER CIRCUIT

[76] Inventor: Heinz Meitinger, Theodor-Huess-Str. 16, D-7075, Mutlangen, Germany

[22] Filed: Dec. 15, 1972

[21] Appl. No.: 315,611

[30] Foreign Application Priority Data

Dec. 27, 1971 Germany........................... 2164676

[52] U.S. Cl........................... 307/225 B, 307/223 B
[51] Int. Cl....................... H03k 23/08, H03k 23/04
[58] Field of Search........ 307/221 R, 221 B, 220 R, 307/220 B, 223 R, 223 B, 225 R, 225 B

[56] References Cited

UNITED STATES PATENTS

| | | | |
|---|---|---|---|
| 3,681,617 | 8/1972 | Moriyasu | 307/225 |
| 3,564,282 | 2/1971 | Vogelsberg | 307/221 B |
| 3,617,778 | 11/1971 | Korom | 307/225 B |
| 3,329,834 | 7/1967 | Klinkowski | 307/221 B |
| 3,675,044 | 7/1972 | Vogelsberg | 307/221 R |
| 3,383,521 | 5/1968 | Greenberg | 307/221 B |
| 3,715,604 | 2/1973 | Rapshys | 307/220 R |
| 3,294,985 | 12/1966 | Kramasz | 307/220 B |
| 3,309,537 | 3/1967 | Archer | 317/235 AB |

*Primary Examiner*—Rudolph V. Rolinec
*Assistant Examiner*—William D. Larkins

[57] ABSTRACT

A frequency divider circuit which allows to divide the input signal in the ratio of factor two or higher. The circuit mainly consists of thyristor systems and does not necessarily need capacitors to store the operating situation of the circuitry. The current paths are arranged in such a manner that only one current path is conducting at a time.

3 Claims, 2 Drawing Figures

FREQUENCY DIVIDER CIRCUIT

BACKGROUND OF THE INVENTION

The present invention constitutes the subject matter of my copending German patent application, Ser. No. P 21 64 676.4, filed Dec. 27, 1971.

The known frequency divider circuits are arranged in the way of interlinked transistors, whereby the transistors are mutually connected together in the way that only one of the two transistors can be turned on at a time. The division ratio of these frequency divider circuits is always 1 to 2 per divider stage. There are always two current paths conducting, on the one hand to the collector-emitter-path of the transistor being turned on and on the other hand the control path of this transistor. Besides, a capacitor as timing element is always required in these arrangements. After the appearance of a control pulse the information is stored in the said capacitor; the said information indicating which side of the frequency divider circuit is to go into conduction at the next step.

SUMMARY OF THE INVENTION

The instant invention presents an arrangement that does not make use of the said capacitors. Furthermore it allows a division ratio greater than 2 to 1, whereby, besides the control pulse, only one current path per divider stage is conducting.

BRIEF DESCRIPTION OF THE DRAWINGS

The special features of the invention are described in conjunction with the accompanying drawings, in which.

DETAILED DESCRIPTION OF THE INVENTION

Figure 1:
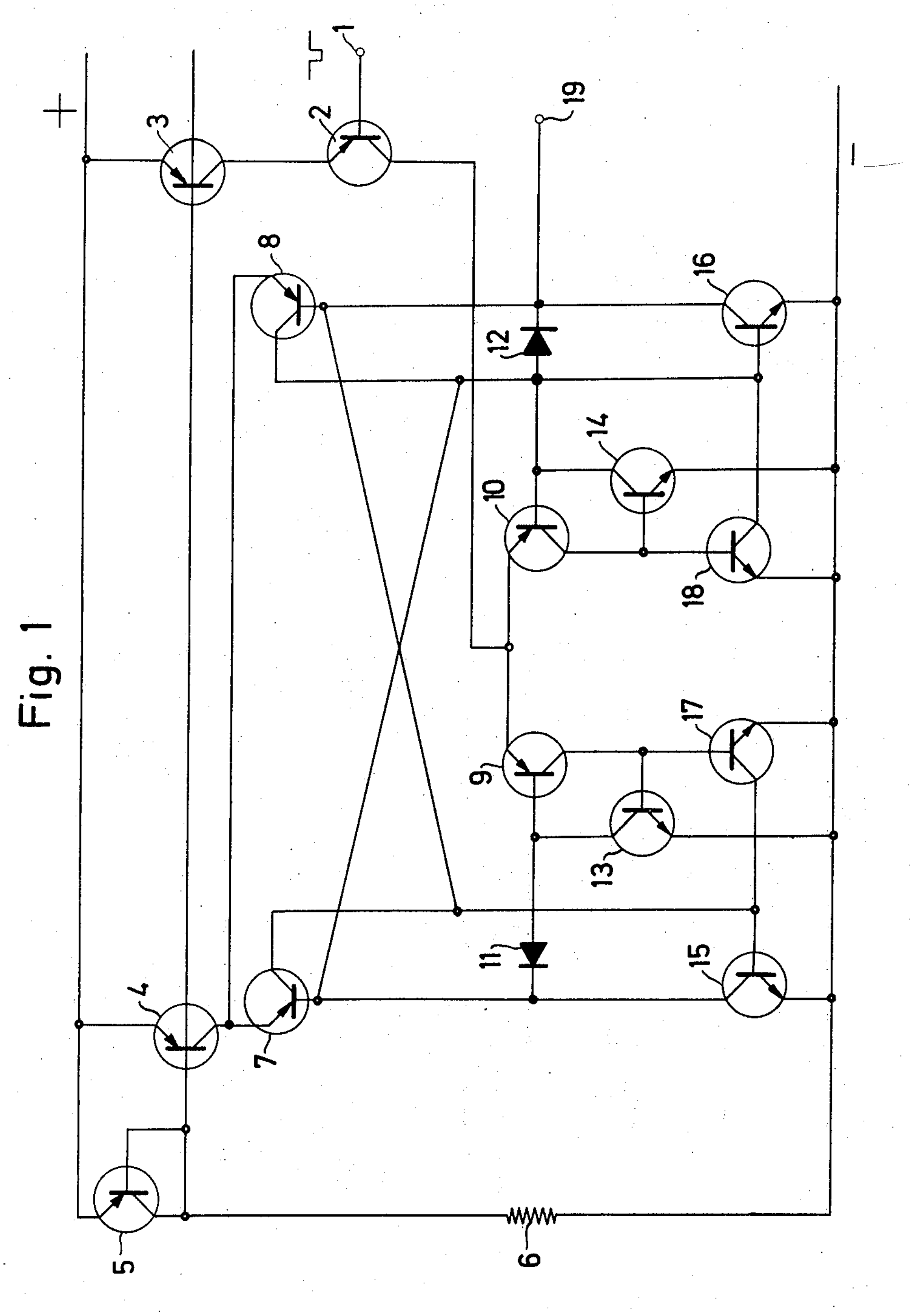
FIG. 1 shows an embodiment of the frequency divider circuit with the division ratio of 2 to 1 in accordance with the invention.

The embodiment shown in FIG. 1 operates in the way described hereafter:

The divider stage with two sections consists of the transistors 7, 15 and 8, 16 being coupled up to form thyristor systems. These thyristor systems are connected to the positive pole of the battery via the current source 4. The transistor 5 thereby serves for temperature stabilization. The resistor 6 allows to adequately adjust the current sources. The thyristor systems 7, 15 and 8, 16 are coupled in the way that in case the transistor 15 is turned on, the transistor 16 becomes blocked and vice versa. As soon as one of these thyristor systems is fired, the other system is blocked. The control signal is connected up to the input circuits of the two sections through the transistor 2 being connected to the current source 3. The input circuits consist of the transistors 9, 13 and 10, 14 likewise being coupled up to form thyristor systems. The respective input circuit being conducting additionally turns on the transistors 17 or 18 that can block the thyristor system of one section each. In case the transistor 2 does not become turned on by a control signal, one of the two systems 7, 15 or 8, 16 is conducting. This is secured by the cross connection, whereby the base of the transistor 7 is connected to the base of the transistor 16 or the base of the transistor 8 is connected to the base of the transistor 15. A current can only flow in the said cross connection if sufficient voltage is available to surmount two transistor threshold voltages. As soon as one of the two systems 7, 15 or 8, 16 is turned on, there only exist one threshold voltage plus one residual voltage between the collector of the current source 4 and the negative pole of the battery, thereby preventing that the other system can go into conduction. As soon as the transistor 2 becomes turned on by a control signal, the transistors 9 and 10 are connected to the positive pole of the battery. Assuming now that the system 7, 15 is turned on, a current is generated across the base-emitter-path of the transistor 9, the diode 11 and the collector-emitter-path of the transistor 15, the said current turning on the transistor 9. This requires a voltage surmounting two threshold voltages and one residual voltage. The transistor 10 does not become turned on as the transistor 16 is non-conducting. As soon as the transistor 9 is turned on, the transistor 13 likewise becomes turned on, whereby the voltage on the transistors 9 and 10 drops to the amount of one threshold voltage plus one residual voltage. Now, the transistor 17 becomes turned on, too, whereby the system 7, 15 becomes blocked. As soon as the system 7, 15 is blocked, the system 8, 16 goes into conduction. Although the impulse signal is still applied to the transistors 9 and 10, the transistor 10 cannot become turned on as for turning on the latter two threshold voltages for the base-emitter-path of the transistor 10 and the diode 12 as well as one residual voltage for the transistor 16 would be required. Only one threshold voltage and one residual voltage are existing, however. So, the system 8, 16 remains conducting independent of the length of the control pulse. As soon as the control pulse is terminated, the system 9, 13 is rendered non-conducting. The following control signal will then turn on the transistor 10 via the diode 12 and the transistor 16, whereby the system 8, 16 is rendered non-conducting and the system 7, 15 goes into conduction again.

Figure 2:
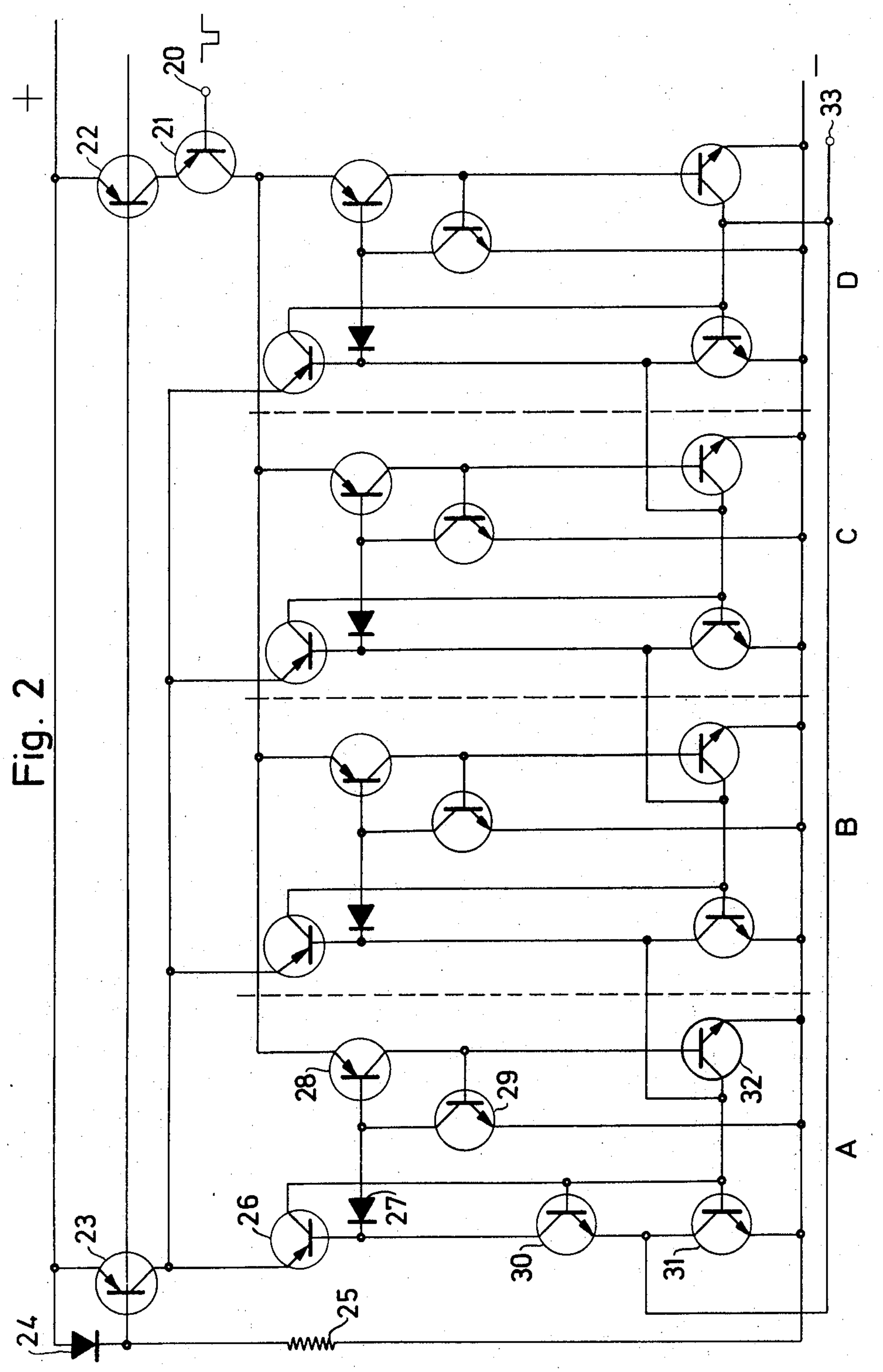
FIG. 2 shows an embodiment of the frequency divider circuit with the division ratio of 4 to 1 in accordance with the invention.

FIG. 2 shows the embodiment of a frequency divider with the division ratio of 4 to 1 which is designed in accordance with the instant invention. The mode of operation largely corresponds to the one represented in FIG. 1.

Sections B, C and D are completely equal. Section A only differs from the other sections by making use of the transistor 30. The said transistor 30 serves for slightly increasing the holding voltage for section A so that, in case more than one section should go into conduction after having turned on the frequency divider, the additional signals will fail as soon as they travel over section A. The necessity of such a transistor 30 can be avoided when making sure by special devices that only a certain section of the frequency divider goes into conduction when turning on the frequency divider. The first thyristor system consisting of the transistors 26, 31 of the sections A to D is connected to the same current source 23. The control transistors 28 and 29 forming the second thyristor system of all sections A to D are activated by the same transistor 21. The control signal 20 appears at the base of the transistor 21. When the said control signal occurs, the emitter of the transistors 28 of the second thyristor system is connected to the positive pole of the battery. Provided that the transistors 26 and 31 of the first thyristor system were turned on, the second thyristor system with the transistors 28, 29 becomes turned on via a diode 27 and a transistor 31 as in FIG. 1. As soon as the second thyristor system with the transistors 28, 29 is turned on, the voltage on the emitters of the transistors 28 of the of thyristor system f all sections A to D drops to the amount of one threshold voltage and one residual voltage. As soon as the second thyristor system 28, 29 is turned on, the transistor 32 becomes turned on which blocks the first thyristor system 26, 31 of section A and fires the equivalent thyristor system of section B. Now, the second thyristor system 28, 29 remains in a turned on condition as long as the control signal exists. As the voltage being established on the second thyristor system 28, 29 of section A is too low, the second thyristor system 28, 29 of the other sections cannot become turned on via the diodes 27. As soon as the control signal disappears, all second thyristor systems 28, 29 of the sections A to D are rendered non-conducting. The following control signal will then block the first thyristor system with the transistors 26, 31 of the section then being turned on and will fire the first thyristor system 26, 31 of the next section. The collector of the transistor 32 of section D is connected to the collector of the transistor 31 of section A so that the four sections of this frequency divider circuit are interconnected to form one unit that divide a control signal appearing at the input 20 in the ratio of 4 to 1. The output signal can be tapped off from point 33. It goes without saying that, according to the arrangement in FIG. 2, a frequency divider with every desired integer division ratio can be designed. It is also possible to use the frequency divider as shift register, whereby every single section is connected to a special output connection. The thyristor systems used in the circuit can also be arranged in the way that the various electrodes of the transistors are combined, as is usual in practice.

It is to be understood that the above described arrangement is an illustration example of the application only. Numerous other arrangements may be readily devised by those skilled in the art which will embody the principles of the invention and fall within the spirit and scope thereof.

I claim:

1. A frequency divider comprising a plurality of interconnected stages, each stage including first and second thyristor means, each said thyristor means having a first emitter, a second emitter, a first gate, and a second gate, the respective first emitters and second emitters of all of said first thyristor means being connected in common whereby only one of said first thyristor means can be conducting at a given time, the respective first emitters and second emitters of each of said second thyristor means being connected in common whereby only one of said second thyristor means can be conducting at a given time, each stage further including a transistor having emitter, base and collector electrodes, the base electrode of the transistor in each stage being connected to the second thyristor means in that stage, the collector electrode of the transistor in each stage being connected to the first gate of the first thyristor means in that stage, and the emitter of the transistor in each stage being connected to the first emitter of said first thyristor means, the second gate of the first thyristor means in each stage being connected to the first gate of the first thyristor means in a different stage, whereby, upon application of a control signal in common to each of said second thyristor means, the first thyristor means which was conducting immediately prior to application of the control signal is extinguished by the transistor connected to its first gate, and a different first thyristor means is rendered conductive via the second gate to first gate connections between the first thyristor means of different stages.

2. Frequency divider in accordance with claim 1 wherein said second thyristor means in each stage is rendered conductive by said control signal flowing via a diode connecting one gate of said second thyristor means to said first thyristor means in same stage, herewith resulting in that the voltage necessary to render conductive said second thyristor means in each stage is higher than the voltage remaining after rendering conductive said second thyristor means, herewith omitting that the same control signal can render conductive said second thyristor means of the following stage.

3. Frequency divider in accordance with claim 1 wherein the resistance of said first thyristor means in one stage is increased to such a level that said first thyristor means of said one stage will not remain conductive if one of said first thyristor means in other stages is conducting.

* * * * *